INVENTOR.
John E. Van Tuyl

Feb. 24, 1959  J. E. VAN TUYL  2,874,719
LIQUID FEEDING APPARATUS
Filed May 17, 1955  3 Sheets-Sheet 2

INVENTOR.
John E. Van Tuyl
BY Bosworth, Sessions,
Herrstrom + Lawler
ATTORNEYS

Feb. 24, 1959  J. E. VAN TUYL  2,874,719
LIQUID FEEDING APPARATUS
Filed May 17, 1955  3 Sheets-Sheet 3
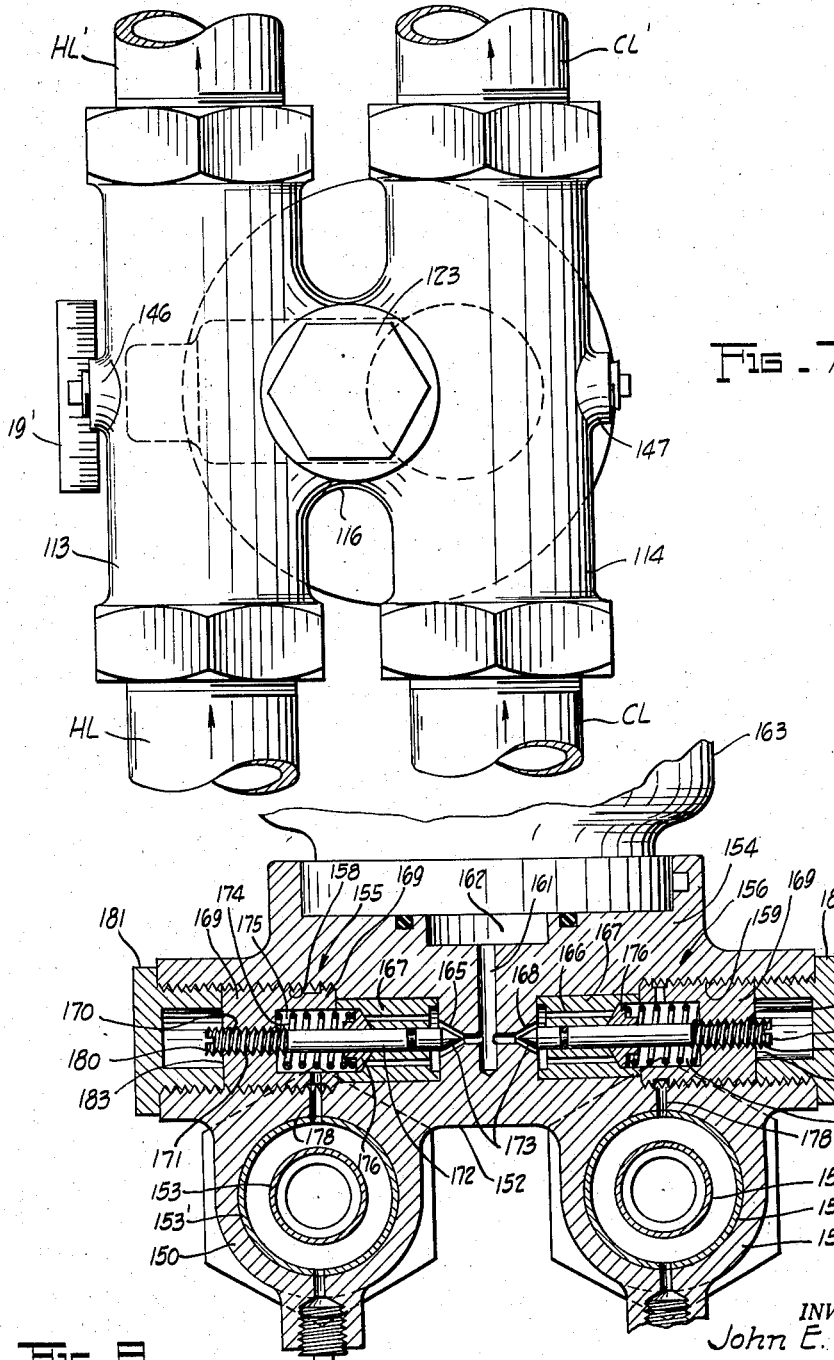
INVENTOR.
John E. Van Tuyl
BY Bosworth, Sessions,
Herrstrom & Lawler
ATTORNEYS United States Patent Office 2,874,719
Patented Feb. 24, 1959

2,874,719

LIQUID FEEDING APPARATUS

John E. Van Tuyl, Cleveland, Ohio, assignor to Albert C. Mader, Parma, Ohio

Application May 17, 1955, Serial No. 508,877

1 Claim. (Cl. 137—604)

This invention relates to liquid feeding apparatus and more particularly to apparatus for automatically feeding one liquid by suction into another liquid flowing through a confined area for the purpose of treating the other liquid. Such feeding apparatus is used, for example, in water softening systems.

Hard water may be softened by the addition of a concentrated sequestering agent in the form of a liquid to the water system for sequestering the salts and other impurities in the water and holding these impurities in harmless suspension. Since the ratio of the dosage of such additives per unit volume of water being treated is relatively small, fine control of the flow of the additive is necessary. Because of the small passages in the feeding apparatus through which the additive flows, there is a tendency of the apparatus to become clogged by foreign particles with resultant adverse effects on the water softening operation, especially in view of the criticalness of control of the additive flow, in which feeding apparatus that can be readily disassembled, inspected, cleaned and otherwise maintained is therefore highly desirable. In addition, replenishment of the supply of liquid additive also presents the problem of loss of additive through spilling and the resulting inconveniences.

A general object of my invention is the provision of an automatic water softening liquid feeding device of simplified construction which can be disassembled readily for inspection, cleaning and/or replacement of parts. Another object is the provision of a liquid feeding device with a novel combination liquid flow control and check valve. Another object is the provision of a liquid feeding device which is compact and which can be readily installed in a water supply line. A further object is the provision of a liquid feeding device with flow control valves that can be removed from the device without disturbing the connection of the device to the water supply line. Another object is the provision of a single liquid feeding device that can be connected to a pair of closely spaced water supply lines and automatically feed liquid into either or both of the supply lines. Still another object is the provision of liquid feeding apparatus with means for replenishing the supply of additive without spilling it. A further object is the provision of a liquid feeding device with a detachable supply container having means for insuring correct assembly of the container on the housing of the feeding device. Another object is the provision of a feeding device which is compact, economical to manufacture and to maintain, and simple to operate.

The mode of attainment of these and other objects of my invention will become apparent from the following description of a preferred embodiment thereof, reference being had to the accompanying drawings.

Figure 7 is a bottom view of the device of Figure 6 as viewed along the line 7—7 of Figure 6.

Figure 8 is a central vertical section of another form of feeding device designed for use with a pair of water lines.

Figure 1:
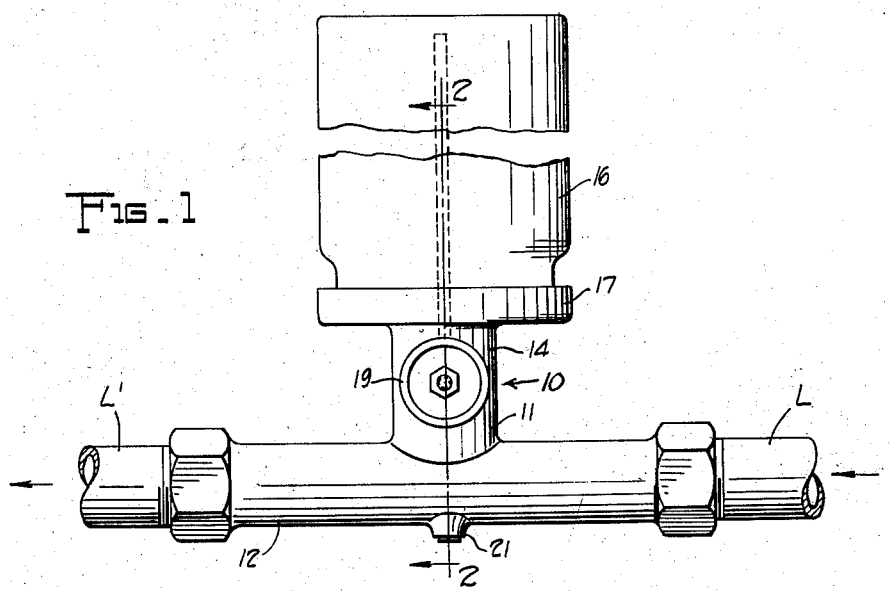
Figure 1 is an elevation showing a water supply pipe with water softening feeding apparatus embodying my invention installed thereon.

A preferred embodiment of my invention is illustrated in Figure 1 as a feeding device generally indicated at 10 connected in series with sections L and L' of a pipe line through which water to be treated flows in the direction of the arrow. The feeding apparatus preferably comprises a unit housing or casing 11 having a cylindrical hollow base or nipple 12, a central valve section 14 extending outwardly, vertically as shown, from the middle part of the nipple 12, and a supply vessel or jar 16 containing a water softening additive, such as a solution of hexametaphosphate, and mounted in an inverted position within and on a recessed flange 17 on top of the housing. The liquid additive in the jar 16 feeds into the valve section of the housing and is drawn at a selectively controlled rate of flow into the water flowing through the nipple by suction created in the nipple by restriction of water flow in the manner of a Venturi tube. Calibrated knob 19 affords control of liquid flow through the device so that the correct quantity ratio of sequestering agent to treated water is maintained. Nipple 12 is provided with an adapter flange 21 opposite the valve section in order to facilitate connection of vacuum measuring instruments for determining flow conditions in the main line preliminary to adjusting control knob 19 to a proper setting for feeding the additive in the water in a predetermined quantity ratio.

Figure 3:
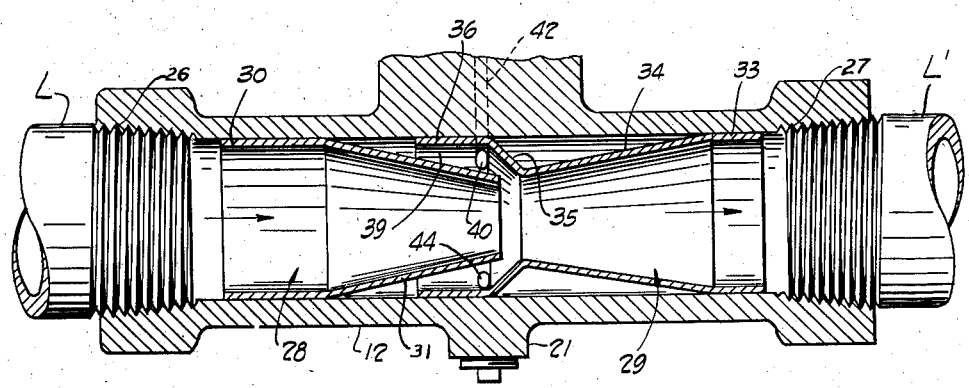
Figure 3 is a vertical section showing water flow restrictor tubes in the base of the feeding device, the section being taken on the line 3—3 of Figure 2.

The ends of nipple 12 are hexagonally shaped on the exterior and have internal tapered pipe threads 26, 27, see Figure 3, which engage the threaded ends of pipe sections L and L', respectively, when the feeder unit is installed in the line. In order to create a vacuum to draw the additive into the water stream, restrictor tubes 28, 29 are press fitted into opposite ends of the nipple 12 before connection of the unit in the water line. Tube 28 has a cylindrical support portion 30 snugly engaging the interior of the nipple and has a frusto-conical integral portion 31 reducing inwardly from a maximum to a minimum diameter approximately midway between the ends of the nipple. Tube 29 likewise has a cylindrical support portion 33 press fitted within the outer part of the opposite end of the nipple and has a frusto-conical part 34 which tapers inwardly toward tube 28 and which joins a flared portion 35 of tube 29 at a point axially spaced slightly from the end of tube 28, flared portion 35 ultimately merging with the inner cylindrical end portion 36 of tube 29.

When tubes 28 and 29 are assembled in operative position within the nipple, the inner end of tube 28 is partially telescoped within the flared portion 35 of tube 29, the annular space 39 between the telescoped ends of these tubes constituting a vacuum or suction chamber. The wall of the inner end portion 36 of tube 29 has an aperture 40 aligned with a feed channel or passage 42 extending into the valve section of the housing. Water flow in the main line in the direction of the arrow is partially restricted by tube 28 which creates a vacuum in chamber 39 which serves to draw the water softening additive through passage 42 and ultimately into the water stream. The inner portion 35 of tube 29 also has a lower aperture 44 in alignment with opening 45, see Figure 2, in test adapter 21 to permit measurement of the vacuum in chamber 39 when water is flowing in the line in order to adjust the additive flow control knob to the proper setting for the particular installation.

Valve section 14 of the housing is laterally elongated, as shown, and has a stepped bore extending therethrough consisting of an untapped length 46 and successively diametrically larger tapped lengths 47 and 48. Disposed within the stepped bore is a combination needle and check valve assembly for respectively controlling the rate of flow of additive and for preventing back surging of water from the main line through the valve section. This valve assembly comprises a needle valve having an elongated stem 49 provided with a threaded enlargement 50 which engages the threads in the intermediate portion 47 of the valve section bore and which, when the stem is rotated, advances and retracts the needle valve, to the right and left, respectively, as viewed in Figure 2. The outer end, left as viewed in the drawings, of the valve stem extends snugly through the untapped length 46 of the bore and exteriorly of the valve section for connection with the calibrated knob 19. The opposite end portion of the stem passes through a close fitting central hole 54 in check valve collar 55 and terminates in a conical valve head 56 which extends into recess 58 in an adjacent plug 60 for engagement, in the closed position, with a conical valve seat 61 formed in the plug. Both the collar 55 and the plug 60 are threaded externally and engage the threads in the tapped length 48 of the stepped bore.

One end of collar 55 has a recess 66 formed with a conical check valve seat 67 adjacent collar hole 54, and a conically shaped check valve head 68 slidably mounted on valve stem 49 is disposed within the collar recess 66 and is engageable with the seat 67. A plurality of circumferentially spaced axial passages 69, extending through the collar, intersect the seat 67 and are closable by check valve head 68 under the pressure of a spiral spring 70 disposed within collar recess 66 concentrically of valve stem 49 and abutting the back of the check valve head and an internal shoulder 71 in valve section 14 between the tapped lengths 47 and 48 of the stepped bore. An aperture 72 in the wall 73 of the collar circumscribing the recess 66 is aligned with feed passage 42 leading to the inside of the nipple 12 and thus axial passages 69 in the collar communicate through recess 66 with feed passage 42 when check valve head 68 is withdrawn from seat 67. Spring 70 is selected with a predetermined spring rate such that the spring will yield when the check valve head is acted upon by a minimum vacuum in collar recess 66 induced by the initial flow of water in the restricted zone of the nipple, thereby permitting the check valve head to unseat and to open collar passages 69.

The inner end face of plug 60 is countersunk at 76 to provide communication between recess 58 in the plug and the axial passages 69 in collar 55. Recess 58 in the plug is connected by radial channels or passages 78 to an annular groove 79 in the periphery of the plug, which groove is aligned with and communicates with passage 80 leading to a well 81 in the top of the valve section of the housing. An O-ring 82 seals the plug 60 in the valve section bore.

The entire check and needle valve assembly may be removed readily from the valve section for purposes of inspection, maintenance and/or replacement of valve parts without disconnecting the nipple 12 from the water line. In the disassembly procedure, plug 60 and collar 55 are threaded out of the stepped bore. Knob 19 is removed from the end of valve stem 49, and the latter is threaded out of the intermediate section 47 of the bore and is withdrawn bodily from the larger bore section 48. With the valve assembly thus completely removed from the housing, the various valve parts may be cleaned and separately refinished, if worn, or replaced, and feed passages 42 and 80 in the valve section of the housing may be cleaned. On reassembly the parts are replaced in the stepped bore in the reverse order.

Figure 2:
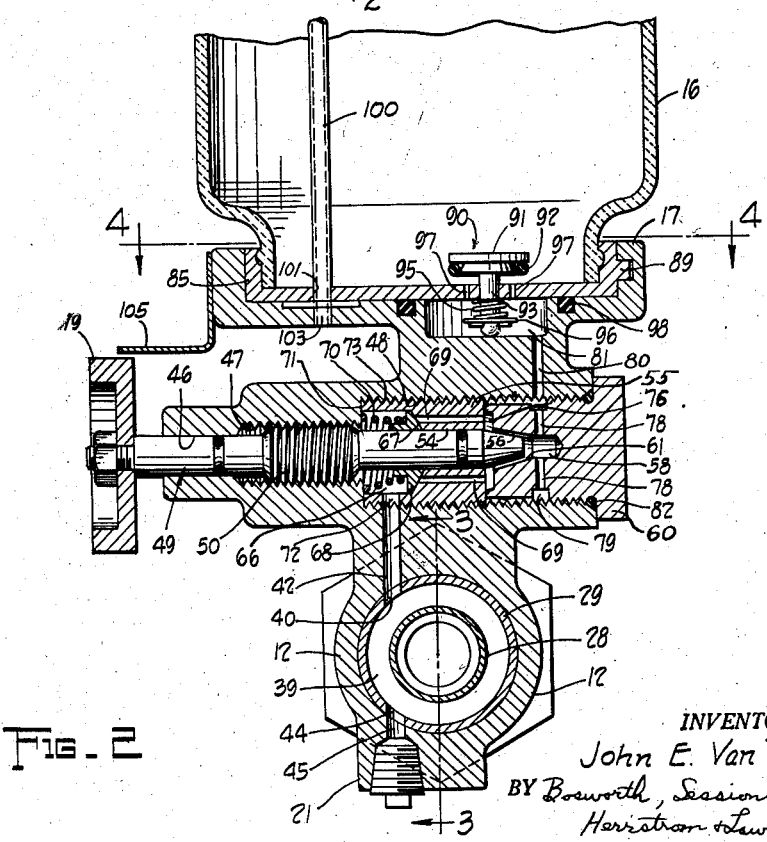
Figure 2 is a central vertical section showing the construction of the feeding apparatus, the section being taken on the line 2—2 of Figure 1.
Figure 5:
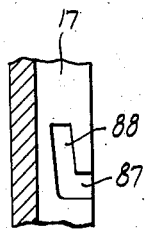
Figure 5 is a fragmentary section showing the supply container entry and locking slots on the interior of the top flange of the feeding device body, the section being taken on the line 5—5 of Figure 4.
Figure 4:
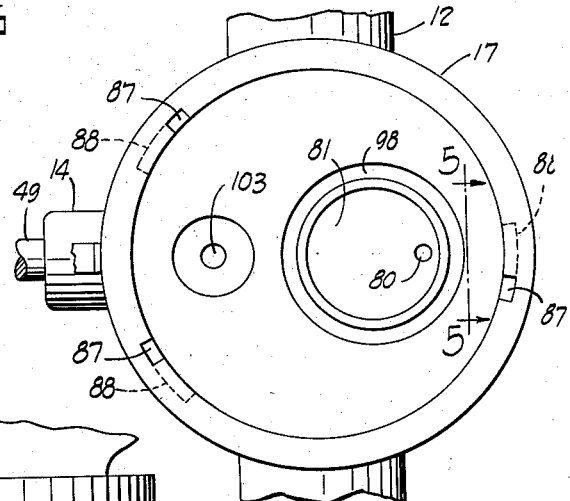
Figure 4 is a view taken along the line 4—4 of Figure 2 and showing the top of the feeding device with the liquid supply vessel removed.

In order to detachably connect jar 16 to the top of the housing, the recessed flange 17 has an inside diameter slightly greater than the outside diameter of jar cover 85 and has cover locking means comprising a plurality, three as shown in the drawings, of vertically opening internal slots 87, see Figures 4 and 5, at differently spaced points on the circumference of the flange. These slots respectively open into downwardly inclined circumferentially extending internal locking grooves 88 on the flange. Jar cover 85 has an equal number of radial lugs 89, one of which is shown in Figure 2, which are circumferentially spaced around the cover in correspondence with the spacing of vertical slots 87 in flange 17. The lugs 89 are dimensioned to slide snugly into the respective slots in the flange. When the jar with cover 85 is connected to the top flange 17, the cover lugs first are vertically aligned with slots 87 and the jar is lowered until the lugs bottom in the vertical slots. Thereafter the jar is rotated, counterclockwise as viewed in Figure 4, the lugs sliding into and being locked within grooves 88. The inclination of each groove 88 causes each lug to be cammed downwardly, thus forcing the cover into tight sealing engagement with the top of the valve section.

In order to prevent spilling of the liquid additive from the jar 16 when the jar is inverted pursuant to connection with the top of the housing, jar cover 85 is provided with a normally closed safety valve, generally indicated at 90, which is mounted on the cover within the jar. This valve consists of a disk 91 which mounts a sealing ring 92 and from which an actuating rod 93 extends through and beyond the outside of the cover. A spring 95 compressed between the cover and a pin 96 in the remote end of the rod urges disk 91 and sealing ring 92 into engagement with the interior of the cover. A plurality of feed holes 97 formed in the cover in alignment with sealing ring 92 are normally closed by the ring in response to the pressure of spring 95. When the jar is assembled on the housing and is locked on the flange 17, valve rod 93 engages the top surface of the housing within well 81 and is pushed inwardly thereby compressing the spring 95 and opening feed holes 97 in the jar cover and permitting the liquid additive to pass from the jar into the well.

An O-ring 98 in the top surface of the housing and surrounding the well 81 engages the outer surface of the jar cover and seals the connection. An air vent tube 100 fastened to the inside of the cover in alignment with a vent opening 101 in the cover extends to the opposite end of the interior of the jar and admits air through opening 103 in the top of the housing to the jar. Since the lugs 89 on the jar cover 85 and the slots 87 in top flange 17 are respectively unequally circumferentially spaced, there is only one position of alignment of all the cover lugs and flange slots and accordingly proper connection of the jar to the top of the housing with the safety valve and vent tubes in vertical alignment with the well 81 and with vent opening 101, respectively, is assured.

The housing including the nipple 12, valve section 14 and top flange 17 preferably are cast or otherwise formed as one piece. It will be noted that feed passage 42 and opening 45 in test adapter 21 are vertically aligned, see Figure 2, this construction facilitating the forming of the feed passages in the lower part of the device. Prior to forming these passages, restrictor tube 29 is inserted in the nipple in the position shown in Figure 3 and collar 55 is threaded fully into its assembled position, see Figure 3, in the bore in the valve section. Thereafter, and in one operation, test hole 45, openings 44 and 40, in the restrictor tube 29, feed channel 42 in the lower part of the valve housing and opening 72 in the wall 73 of collar 55 are drilled. The collar is then removed and the needle and check valve assembly is assembled in the stepped bore in the manner described above.

In operation, the needle valve head 56 initially is withdrawn a predetermined distance from seat 61 by setting of the calibrated knob 19 to a proper reading opposite pointer 105 to correspond with the pressure or flow conditions of water in the main line and to thereby maintain the correct quantity ratio of additive mixed with the water. When water in the main line is not flowing, spring 70 in collar recess 66 forces check valve head 68 against seat 67, closing axial passages 69 in the collar 55 and preventing flow of additive into the nipple and likewise preventing back flow of water through the valve section of the housing. When the water is turned on and flows through the line, a vacuum is created in the annular space 39 between the restrictor tubes in the nipple, and causes check valve head 68 to withdraw from seat 67, to the left as viewed in Figure 2, compressing spring 70. With axial collar passages 69 thus opened, the additive is drawn from the well 81 in the top of the housing, through the restricted opening at the needle valve seat 61, through axial collar passages 69 into recess 66 at the end of the collar, through feed passage 42 and finally into the water flowing through the nipple. When the water is turned off, check valve head 68 immediately closes under the pressure of spring 70 and hence the feeding device is fully automatic in its operation.

Figure 6:
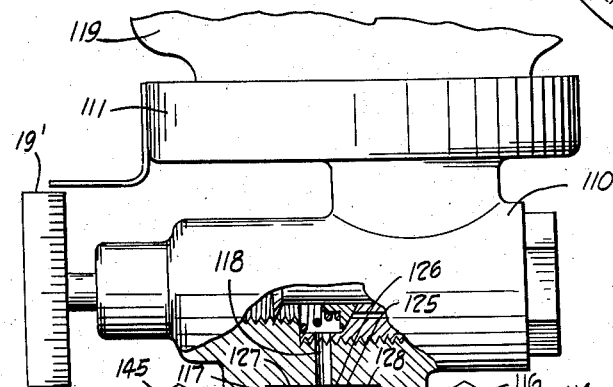
Figure 6 is a view partially in section and similar to Figure 2 showing a modified construction of the feeding device which is adapted for use with a pair of water supply lines.

The precepts of my invention can be practiced to feed an additive into a pair of juxtaposed water lines, as, for example, the lines that supply hot and cold water to an automatic clothes washing machine. For this purpose, modified forms of my feeding apparatus shown in Figures 6, 7 and 8 are provided. The unit shown in Figure 6 has a valve section 110 and jar mounting flange 111 similar to valve section 14 and flange 17, respectively, shown in Figures 1 and 2, and has a base portion comprising a pair of nipples 113, 114, see Figure 7, which are connected respectively to hot line sections HL, HL' and cold line sections CL, CL' through which water flows in the direction of the arrows. The nipples are centrally joined by connecting portion 116 which has an elongated preferably cylindrical recess 117 extending from the lower side of the connecting portion between the nipples and intersecting feed channel 118 in the lower portion of valve section 110. It will be understood that feed channel 118 corresponds to feed channel 42 shown in Figure 2 and communicates with the jar 119 containing a supply of water softening liquid in the same manner and through the same valving system described in connection with Figure 2. Each of the nipples 113, 114 has a set of flow restrictor tubes 120, 121, similar to tubes 28 and 29, see Figure 3, which defines therebetween an annular vacuum space 122. The single feed channel 118 communicates with the space 122 in each of the nipples so that the water softening liquid is fed from the supply jar through one needle valve assembly to either or both of the nipples.

In order to feed the liquid additive to either one of the nipples independently of the other, a plug 123 having two check valves is removably secured within recess 117 as by threads 124. The upper end 125 of the plug is spaced from the bottom of the recess 117 when the plug is fully inserted therein, the chamber 126 so formed between the plug and the bottom of the recess constituting a manifold with which feed channel 118 communicates. The plug has two substantially identical check valves 127, 128 located in the upper end of the plug as viewed and it will be sufficient to an understanding of their operation that only one be described. The plug is formed with a long bore 130 and a short bore 131 each of which extends from the upper end 125 of the plug into the plug body. The open upper end of each of the plug bores 130, 131 has a check valve seat 133 consisting of a bushing with a channel 134 extending from chamber 126 to the interior of the plug bore, the bushing being threaded into the upper part of the plug bore.

The lower end of channel 134 in the valve seat is normally closed by a ball 135 which is urged against the seat by a spring 136 in the lower part of the plug bore. Short plug bore 131 communicates via a radial hole 138 in the plug, an annular groove 139 in the plug periphery and a feed hole 140 in the wall of nipple 114 with the vacuum chamber 122 in the nipple. Long plug bore 130 likewise communicates with the vacuum chamber in nipple 113 by means of a radial hole 142, an annular groove 143 in the lower part of the plug periphery and a feed hole 144 in the wall of nipple 113. O-ring seals 145 on the plug seal the fluid connections between the plug and the nipples. Nipple adapter flanges 146 and 147 have holes 148, 149 leading into the interiors of the nipples in alignment with liquid feed holes 140 and 144, respectively, to permit testing of the vacuum created in the nipples due to flow of water therethrough in order to initially adjust the knob 19' of the needle valve assembly to the proper valve for feeding the correct quantity of water softening additive to the lines.

The check valves 127, 128 control the admission of the water softening liquid to the nipples 113 and 114, respectively, and operate to open the channels 134 in the bushings independently of each other in response to the vacuum present in the respective nipples. That is to say, when hot water flows through the line HL, HL' and cold water line CL, CL' is shut off, check valve 128 opens to admit the additive to nipple 113 while check valve 127 remains closed. When both hot and cold water flow through the respective lines, both check valves 127, 128 open and admit the additive to both nipples 113, 114 for treating the water flowing in both lines. Thus the hot and cold water lines cannot communicate with each other through the device but both receive the water softening additive from the same source. The plug 123 can be removed when desired for inspection and cleaning of the check valves and the feed passages without disturbing the connection of the nipples to the water lines.

The liquid feeding unit illustrated in Figure 8 is another modified form of my invention designed for use with a pair of water lines and comprises a base having a pair of nipples 150, 151 connected together midway between their ends by a connecting portion 152. Each nipple is fitted with a pair of restrictor tubes 153, 153' which define a vacuum chamber as described above. The valve section 154 of the device preferably is integral with the nipples and comprises a pair of identical needle and check valve assemblies 155 and 156, each of which is similar to the needle and check valve assembly described heretofore and shown in Figure 2. Since these valve assemblies are identical, only one will be described and like reference characters will indicate like parts on the drawings.

The valve section 154 of the feeding device housing is formed with two preferably axially aligned horizontal bores 158, 159 in which the valve assemblies 155, 156 respectively are disposed. The inner ends of these bores communicate with a main feed channel 161 which extends downwardly as viewed from the well 162 on the top of the valve section and into which additive from the supply jar 163 passes. A needle valve seat 165 is formed at the inner end of each bore and communicates with axial passages 166 formed in collar 167 disposed in the bore adjacent the seat 165. Plug 169 threaded in the bore on the side of the collar opposite seat 167 has a tapped hole 170 through which the threaded portion 171 of needle valve stem 172 extends for advancing and retracting the needle valve head 173 toward and away from seat 167 and thereby to control the flow of additive from the main feed channel through the valve assembly. A spring 174 in the recess 175 between the collar and plug urges check valve 176 against the collar to close axial collar passages 166. Feed passage 178 connects recess 175 within the valve assembly to the vacuum chamber in the interior of the respective nipple associated with the valve assembly.

The adjustment of the needle valve to control the flow of additive into the water being treated is related to the water pressure in the line, and may be adjusted to the proper setting at the time of installation and after line pressure has been measured. In order to prevent tampering with the needle valve setting after the unit has been installed, the outer end of the needle valve stem for any of the forms of the invention disclosed herein may be covered, the calibrated knob being omitted. This may be accomplished as shown in Figure 8 by using a shorter stem 172 so that its outer end 180 lies within the bore of the valve section and closing the outer end of the bore with a cap 181. The end of the stem may be slotted as shown to facilitate engagement by a suitable tool for adjusting the needle valve. The outer face 183 of plug 169 preferably is calibrated to indicate the proper needle valve setting corresponding to the water line pressure condition.

The feeding unit shown in Figure 8 operates in the same manner as the unit of Figure 2 with the needle valve assembly for each water line controlling the flow of additive to the associated nipple independently of the flow control system for the other nipple, each valve assembly receiving additive from the common source of supply.

While I have illustrated and described preferred and modified forms of my invention, changes and modifications therein may occur to those skilled in the art who practice my invention and/or come to understand the principles thereof. Therefore I do not wish the scope of my patent to be limited in any manner inconsistent with the progress my invention makes in the art.

I claim:

In a device for feeding additive into a moving liquid, the combination comprising a housing having an additive supply source; a first bore and a second bore, said bores being spaced from each other; an additive inlet channel leading from said additive supply source to said first bore; an additive outlet channel leading from said first bore to said second bore, said additive outlet channel being offset laterally from said additive inlet channel; means in said second bore restricting the flow of liquid in said bore; and, disposed between said additive inlet channel and said additive outlet channel, a valve assembly incorporating a check valve responsive to the flow of liquid in said second bore and a manually adjustable needle valve for controlling the rate of flow of the additive through said additive outlet channel into said second bore, one of said valves being disposed within the other.

References Cited in the file of this patent

UNITED STATES PATENTS

| | | | |
|---|---|---|---|
| 643,074 | Sweeney | Feb. 6, | 1900 |
| 667,559 | Neubauer | Feb. 5, | 1901 |
| 676,239 | Labadie | June 11, | 1901 |
| 897,180 | Whittaker | Aug. 25, | 1908 |
| 1,036,871 | Matheson | Aug. 27, | 1912 |
| 1,050,616 | Cooper | Jan. 14, | 1913 |
| 1,366,591 | Passano | Jan. 25, | 1921 |
| 1,848,691 | Beach | Mar. 8, | 1932 |
| 1,850,063 | Pepper | Mar. 15, | 1932 |
| 1,874,914 | Crowley | Aug. 30, | 1932 |
| 2,450,295 | Parker et al. | Sept. 28, | 1948 |
| 2,564,618 | Williams | Aug. 14, | 1951 |
| 2,573,687 | Brock | Nov. 6, | 1951 |
| 2,708,450 | Mauer | May 17, | 1955 |
| 2,785,012 | Frewin | Mar. 12, | 1957 |